(12) United States Patent
Moineau et al.

(10) Patent No.: US 8,173,719 B2
(45) Date of Patent: May 8, 2012

(54) POLYURETHANE FOAM, METHOD FOR THE PRODUCTION AND USE THEREOF

(75) Inventors: Georges Moineau, Verviers (BE); Marc Mertens, Spa (BE); Dominique Petit, Blegny (BE)

(73) Assignee: Saint-Gobain Performance Plastics Chaineux, Chaineux (BE)

( * ) Notice: Subject to any disclaimer, the term of this patent is extended or adjusted under 35 U.S.C. 154(b) by 1135 days.

(21) Appl. No.: 10/566,654

(22) PCT Filed: Jul. 21, 2004

(86) PCT No.: PCT/EP2004/008145
§ 371 (c)(1),
(2), (4) Date: Feb. 1, 2006

(87) PCT Pub. No.: WO2005/014684
PCT Pub. Date: Feb. 17, 2005

(65) Prior Publication Data
US 2006/0213608 A1      Sep. 28, 2006

(30) Foreign Application Priority Data
Aug. 1, 2003   (FR) ..................... 03 09575

(51) Int. Cl.
*C08G 18/28* (2006.01)

(52) U.S. Cl. .................. 521/172; 428/304.4; 428/423.1; 521/130; 521/157; 521/170

(58) Field of Classification Search .................. 521/130, 521/157, 170, 172; 428/423.1, 304.4
See application file for complete search history.

(56) References Cited

U.S. PATENT DOCUMENTS

| | | | |
|---|---|---|---|
| 4,264,743 A | | 4/1981 | Maruyama et al. |
| 4,386,166 A | * | 5/1983 | Peterson et al. ................. 521/99 |
| 4,581,384 A | * | 4/1986 | Marion .......................... 521/110 |
| 5,521,226 A | * | 5/1996 | Bleys ............................. 521/174 |
| 5,527,834 A | * | 6/1996 | Fujita et al. ................... 521/157 |

FOREIGN PATENT DOCUMENTS

| | | |
|---|---|---|
| EP | 0 714 929 | 6/1996 |
| EP | 0 930 323 | 7/1999 |

\* cited by examiner

*Primary Examiner* — John Cooney
(74) *Attorney, Agent, or Firm* — Oblon, Spivak, McClelland, Maier & Neustadt, L.L.P.

(57) ABSTRACT

The subject of the invention is a water-impermeable flexible polyurethane foam obtained by reacting a polyol component, which comprises at least one hydrophobic polyol, with a polyisocyanate component in the presence of a foaming agent, characterized in that it has a compression force of less than or equal to 12 kPa for 50% compression.
Advantageously it has a density not exceeding 150 kg/m$^3$, preferably not exceeding 60 kg/m$^3$.
The foam may be obtained by a cast-foam manufacturing process or by molding.
It can be used as a water-impermeable seal.

20 Claims, 1 Drawing Sheet

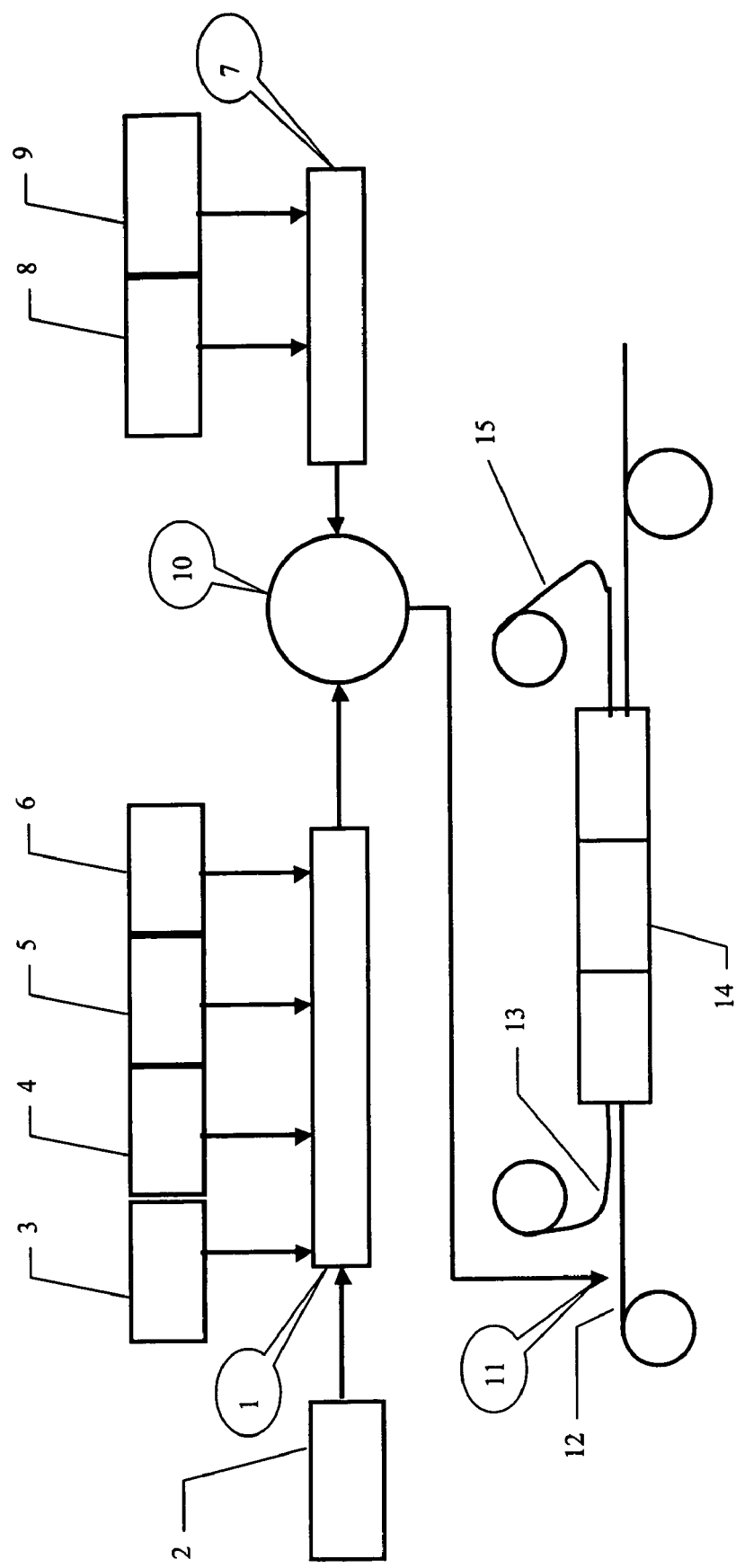

POLYURETHANE FOAM, METHOD FOR THE PRODUCTION AND USE THEREOF

The present invention relates to the field of cellular materials that can be used as seals, and relates more particularly to a polyurethane foam, to its manufacture and to its use.

In the field of automobile construction for example, it is not easy to provide solutions to the problem of sealing between mass-produced parts for which the dimensional variations are accepted with wide tolerances.

This problem is all the more critical in the case of parts that are attached to external body elements or that connect the engine compartment to the passenger compartment, in which the sealing material has several functions, namely vibration reduction, impermeability to air and impermeability to water (flow during rainy weather and cleaning using high-pressure water). Sealing materials are therefore sought that are flexible enough to accommodate dimensional tolerances without deforming the parts to be sealed. However, in general the flexibility of the material tends to prejudice the sealing performance, in particular that of sealing against water, and the risks of a leak are higher the more flexible the seal.

In the automobile industry, the material of choice is polyurethane, which makes it possible to achieve the required density and flexibility levels. However, this material does not in general provide the desired level of water impermeability.

One technique developed by the applicant consists in producing a cellular seal on each part, by in situ deposition of a sealing composition by means of an extrusion head guided over the surface of the part. This technique, described for example in document EP 930 323, makes it possible to form an impermeable skin over the entire surface of the seal, which in particular guarantees water impermeability of the material.

However, this technique assumes the use of suitable equipment in each production shop, and this is not always appropriate in terms of cost.

This is why it would be desirable to have a ready-to-use cellular material, especially one in the form of an optionally self-adhesive tape.

Such materials may be commonly manufactured using the technique referred to as the cast foam technique which a foamable composition is cast as a relatively thick layer on a conveyor belt, the conveyor belt running through treatment (generally heat treatment) stations so as to produce a crosslinked sheet of foam with a maximum thickness of 200 mm. The sheet is then wound up to form a roll, which is cut up into slices, providing a tape wound up on itself. Because of the cutting-up into slices, the tape does not have a skin on its lateral surfaces and the cells of the foam are in direct contact with the atmosphere.

In a variant of the process, called the slabstock process, the amount of foamable material is greater so as to obtain a height/width ratio close to unity. A large amount of the foaming mixture is poured onto a receiving belt, typically so as to produce a thickness of foamed material of around 1 to 2 meters. The mass is stored for the time needed to ensure cross linking right to the core, and is then cut up into horizontal slices, which themselves may be cut up into tape as described above. As a result of these cuts, the material has no skin and the foam cells are in direct contact with the atmosphere on all sides.

These processes generally produce foams with open cells, so as to avoid the phenomenon of shrinkage that occurs when the cells are closed. However, exposure of the cells to the environment is detrimental in terms of sealing.

However, these techniques do make it possible to manufacture flexible polyurethane foams that can accommodate the tolerances in the automobile industry.

Various means have thus been proposed for making the constituent materials of the flexible foams that can be manufactured by these processes hydrophobic for the purpose of achieving better water impermeability.

A first relies on impregnating the foams with hydrophobic substances, by the incorporation of waxes, tars, bitumen, polybutadiene, dialkyl phthalates, petroleum resins obtained by the polymerization of $C_{4-9}$ cracking cuts (see JP-A-55-71777).

Another approach consists in using a hydrophobic polyol as constituent of the polymerization mixture. Thus, document U.S. Pat. No. 4,264,743 describes the formation of a flexible or semirigid polyurethane foam starting from a polyisocyanate component and a polyol component, a major portion of which consists of a polyol derived from a fatty acid dimer or from castor oil.

The presence of the lipophilic chains of the fatty acid dimer or of the castor oil increases the contact angle between the constituent material of the foam and water to 90° or higher, thereby improving the impermeability properties. The reaction between the polyol and polyisocyanate is carried out in the presence of a foaming agent (water or other agent), of a silicone surfactant as foam stabilizer and of a catalyst, with a polyisocyanate/active hydrogen ratio in the mixture (an index generally expressed by the NCO/OH molar ratio) of at least 0.9.

The water impermeability is measured by cutting a round hole at the center of a foam square, placing this piece of foam in intimate contact with two PMMA (Plexiglass) sheets held horizontal, the foam being 75% compressed, by introducing water into the cavity via an orifice made in the upper PMMA sheet and by measuring, for given water pressures, the leaks all around the foam square.

Examples of products of this composition are products with the brand names SUPERSEAL and SUPERSHEET sold by NHK and Recticel. However, it turns out that these products are not as flexible or impermeable as certain applications may require, and they could therefore be improved from the flexibility standpoint while preserving satisfactory water impermeability, or from the water impermeability standpoint while preserving similar flexibility.

This objective, and others that will appear below, is solved by the present invention.

Thus, the subject of the invention is a water-impermeable flexible polyurethane foam obtained by reacting a polyol component, which comprises at least one hydrophobic polyol, with at least one polyisocyanate component in the presence of a foaming agent, characterized in that it has a compression force of less than or equal to 12 kPa for 50% compression according to the ASTM D3574E standard.

In the present application, the term "polyol component" denotes a single polyol compound or a mixture of several polyol compounds. Likewise, the term "polyisocyanate component" denotes a single polyisocyanate or a mixture of polyisocyanates.

According to the invention, the water impermeability is determined by a test called the "U test" in which a strip of square or rectangular section is cut from a sheet of foam, this strip is placed in the form of a U between two transparent glass plates clamped together, water is poured into the concavity of the U to a height sufficient to create the desired water pressure, and the appearance of leaks around the external outline of the U is observed, both at the interfaces with the plates and through the thickness of the foam. According to this test, the foams of the invention provide an impermeable seal for at least one hour for a water height of 10 cm and for a foam compression of only 30%.

The invention achieves a compromise between flexibility and impermeability unknown hitherto, it being possible for the flexibility of the foam to be such that its compression force is as low as about 8 kPa (for 50% compression) without jeopardizing the impermeability.

The foam according to the invention may have a density of 150 kg/m$^3$ or less, especially 100 kg/m$^3$ or less. In a preferred embodiment, the foam has a low density, for example a density not exceeding 60 kg/m$^3$, especially around 45 to 60 kg/m$^3$.

The flexibility of the foam according to the invention can be obtained by limiting the three-dimensional extent of the polyurethane network in various ways, which may possibly be combined.

According to one embodiment, raw materials are chosen in which at least one component from the polyol component, especially at least one hydrophobic polyol, and the polyisocyanate component has a functionality strictly greater than 2, especially at least 2.1, and acts on the stoichiometry of the mixture, by choosing an index of less than 0.90.

According to the present invention, the index is defined as the molar ratio of the isocyanate functional groups to the reactive functional groups that react with the isocyanate, typically hydroxyl groups carried by an alcohol-type compound or by water.

In particular, each of the polyol and polyisocyanate components may have a functionality of greater than 2, especially between 2 and 2.5.

A functionality of greater than 2 of the polyol and/or polyisocyanate components results in a rapid increase in the molecular weight of the polyurethane resulting from the reaction between these compounds. A relatively low index corresponds to an excess of polyol or of other alcohol functional groups, which results in the presence of macromolecular chains terminated by an OH group that does not find an isocyanate group to react with it, with the result that the three-dimensional network is broken. However, it is sufficient for the system to be well crosslinked, which can be checked by the absence of recovery of organic material by a solvent extraction test.

Preferably, the polyol and polyisocyanate components have a relatively limited functionality in order to limit the three-dimensional extent of the network, which is a rigidity factor. Advantageously, the polyol component has a functionality of between 2.1 et 2.3 and the polyisocyanate component has a functionality of between 2.1 and 2.3.

Moreover, an index of less than 0.9, preferably less than or equal to 0.85, especially around 0.70 to 0.85, proves to be particularly advantageous from the standpoint of flexibility of the foam.

According to another embodiment, the stoichiometry of the reaction may be maintained with an index close to 1, especially not exceeding 1.1, but by incorporating, into this mixture, at least one compound of the monofunctional amine or alcohol type (the active hydrogen of the OH or NH$_2$ group of which is used in the calculation of the index), which compound acts as termination agent, thereby limiting the three-dimensional extent. In this case, polyol and/or polyisocyanate raw materials that are more than difunctional will be chosen, that is to say the polyol component and/or the polyisocyanate component have a functionality strictly greater than 2. Such a monofunctional amine or alcohol compound may especially be chosen from a linear, branched, cyclic or heterocyclic aliphatic alcohol, which may or may not be substituted, for example a $C_{1-22}$ alcohol, with an aliphatic or fatty chain, especially $C_{12-22}$ chain, for example methanol, propanol, butanol, 2-ethylhexyl alcohol, isooctanol, dodecanol, a $C_6$ or higher aromatic alcohol, or indeed polymers terminated by hydroxyl groups.

The use of a hydrophobic polyol compound contributes in large part to the hydrophobicity of the foam.

A useful hydrophobic polyol compound according to the invention advantageously has a fatty hydrocarbon chain, in particular containing at least 12, and preferably at least 16 or 18, carbon atoms.

One particularly preferred polyol according to the invention is derived from a fatty acid dimer. Advantageously, it has a $C_{20-44}$, preferably $C_{32-36}$, fatty chain. It preferably results from the double esterification of a fatty acid dimer by a polyol. By way of illustration, mention may be made of the products with the brand name TESLAC that are distributed by Hitachi.

According to a somewhat less preferred embodiment, the polyol component may be a mixture of a hydrophobic polyol and a nonhydrophobic polyol, especially one with a polyether or polyester chain, in which the amount of hydrophobic polyol is predominant. A nonhydrophobic polyol component is in fact used in a limited amount in order not to negatively affect the water impermeability.

Moreover, the polyisocyanate component may comprise at least one component of functionality at least equal to 2 with a low molecular weight chosen from para-phenylene diisocyanate, trans-1,4-cyclohexane diisocyanate, 3-isocyanate-methyl-3,3,5-trimethylcyclohexyl isocyanate, 1,5-naphthalenediisocyanate, methylene bis(phenylisocyanate) (MDI) and its isomers, 4,4'-methylene bisphenylisocyanate (4,4'-MDI), 2,4-methylene-bis(phenylisocyanate) (2,4'-MDI), 2,2'-methylene-bis(phenylisocyanate) (2,2'-MDI), raw or polymeric MDI, 2,4-toluene diisocyanate (TDI) and 2,6-toluene diisocyanate (2,6-TDI). Preferably, it comprises predominantly methylene-bis-4,4'-phenylisocyanate (MDI), optionally as a mixture with other polyisocyanates, such as those mentioned above. It proves to be most particularly advantageous for this compound to contain a significant proportion, for example at least 30 mol %, of 2,4' isomer, which breaks the crystallinity of the hard segments of the polyurethane.

According to a somewhat less preferred embodiment, the polyisocyanate component may optionally comprise an isocyanate-terminated oligomer or polymer, especially a polyether, polyester, polyolefin, polybutadiene, polyisoprene, polydimethylsiloxane, or polycaprolactone oligomer or polymer, in which the oligomer or polymer has a molecular weight not exceeding 10 000 g/mol, preferably around 250 to 4000 g/mol, and in particular from 300 to 1000 g/mol. Preferably, the oligomer backbone is of the aliphatic and/or aromatic polyester type, preferably essentially aromatic, especially one derived from aliphatic glycols, possibly diethylene glycol, and from aliphatic and/or aromatic acids; or of the polyether type, especially polyethylene oxide and/or polypropylene oxide or polytetrahydrofuran. Examples of polyisocyanate compounds are the products with the brand name LUPRANAT from BASF, SUPRAEC from Huntsman and MONDUR from Bayer. Such an oligomeric polyisocyanate compound is preferably used in a limited amount so as not to negatively affect the water impermeability.

The foaming agent used for manufacturing the foam is preferably a chemical foaming agent, that is to say one that reacts with the constituents of the reaction mixture in order to liberate a cell-forming gas. Such a reactive agent forming part of the composition of the foamable mixture is advantageously water. It reacts with the isocyanate in order to generate carbon dioxide responsible for the foaming. It may be combined or replaced with another type of physical foaming agent (pressurized gas or dissolved volatile gas).

The mixture furthermore advantageously includes a foam stabilizing surfactant, which preferably has at least one reactive functional group that reacts with the polyisocyanate compound or with the polyol compound. These reactive functional groups allow a chemical bond to be created between the surfactant and the polyurethane polymer itself, thereby limiting the phenomenon of organic compound release, known as fogging, which tends to create visible deposits on the cold surfaces, even those not close to the foam, such as for example in vehicles in which the ventilation may entrain the particles over substantial distances.

An example of a surfactant of this type is a derivative of polydimethylsiloxane grafted with hydroxyl groups, for example grafted with a polymer possessing pendant hydroxyl groups, especially those grafted by a hydroxyl-terminated polyether chain.

The polyurethane foam according to the invention may also contain one or more other standard additives, such as dyes or pigments, fillers, thixotropic agents, flame retarders, antioxidants, fungicides and biocides. Like the surfactant, such another additive may be provided with reactive functional groups that react with the polyisocyanate or polyol compound, so that it is incorporated into and linked to the polymer network, thus limiting the fogging phenomenon.

The foam according to the invention may be obtained by various processes, especially a cast foam process forming a sheet of foam, or a molding process, especially by injection molding or molding into an open mold that can form a three-dimensional foam part.

The subject of the invention is also a process for manufacturing such a polyurethane foam. It comprises the following steps:

a reaction mixture comprising the polyol component, the polyisocyanate component and the foaming agent is prepared;

the reaction mixture is cast on a conveyor belt; and the conveyor belt and the cast mixture are made to run through a crosslinking oven. Advantageously, an upper protective film is deposited on the cast mixture, and the conveyor belt and the cast mixture coated with the upper protective film are made to run through a crosslinking oven. The use of an upper protective film allows the formation of an impermeable upper skin and prevents the foam-forming gas from escaping via the surface of the cast mixture, thus contributing to the formation of a low-density foam.

It is also possible beforehand to place a lower protective film on the conveyor belt so as to control the formation of an impermeable skin on this other face.

Advantageously, the lower protective film or the upper protective film may be provided with an adhesive on its face in contact with the reaction mixture, so as to constitute a self-adhesive foam.

It is also possible to remove the lower protective film and/or the upper protective film and attach, to a free face of the foam strip, another film provided with an adhesive.

The subject of the invention is also another process in which the reaction mixture is injected or cast into a closed or open mold and the mixture is crosslinked in the mold.

Finally, the subject of the invention is the use of a foam as defined above as a water-impermeable seal.

The invention will now be described in greater detail in the following non-limiting examples.

Preparation and Application of the Reaction Mixture

These are carried out in a cast-foam manufacturing device such as that shown in FIG. 1.

A polyol phase is prepared at 1 by mixing, at room temperature, the polyol compound(s) 2 with a surfactant 3 and other additives, such as dyes, pigments or fillers 4, water 5, as foaming agent, and a catalyst 6. Also prepared, at 7, is a polyisocyanate phase, where appropriate by mixing several isocyanate compounds 8 and 9.

The polyol phase is then mixed with the polyisocyanate phase using a mixing head 10 known per se. To obtain better reproducibility of the cellular structure, it may be advantageous to control the amount of gas contained in the materials according to the prior art.

The polyol phase/polyisocyanate phase mixture is poured out at 11 with a desired thickness onto a lower film 12 that forms an inextensible continuous substrate that may or may not be nonstick. Examples of nonstick coatings are materials such as siliconized paper and a Teflon®-coated fabric. Immediately after the coating, an upper film 13, identical to or different from the film 12, is applied to the mixture layer. The whole assembly then passes through a crosslinking oven 14, which may be divided into various independently controlled temperature zones, at a speed and for a time sufficient to complete the crosslinking. At the outlet of the oven there may be a device 15 for peeling off the upper film 13 and for recovering it in the form of a roll, which can be recycled in the crosslinking process.

Evaluation of the Foam

This is carried out on the foam obtained, with the film or films possibly protecting it having been removed, thus exposing the two skins formed on the main surfaces of the foam sheet.

The density of the foam and its 50% compression force according to the ASTM D3574E standard are then determined.

An impermeability test, mentioned above, is carried out: a strip 300 mm in length and at least 12 mm in width, preferably of square cross section, is cut from the foam sheet. This strip is placed in the form of a U between two transparent glass plates cleaned beforehand using isopropyl alcohol, those surfaces of the strip that have a skin being placed against the glass, while the lateral surfaces resulting from the cutting are exposed to the space between the glass plates. The glass plates are spaced apart using a spacer so that the strip is 30% compressed compared with its original thickness. The whole assembly is left to stabilize for 30 minutes at 23±2° C. Next, water is poured into the concavity of the U so as to obtain a maximum depth of 100 mm. The appearance of leaks around the external outline of the U is measured both at the interfaces with the plates and through the thickness of the foam. To pass this test, no leak must be detected after 60 minutes, either by lack of resistance to the water pressure on the contact surfaces or by capillary effect through the thickness of the foam.

EXAMPLE 1

In this example, a formulation based on a polyol component derived from a fatty acid dimer and a polyisocyanate component based on polymeric MDI was used. The components of the mixture were the following:

Polyol compound A1 a polyol based on a $C_{32-36}$ fatty acid dimer with a functionality of 2.2 and an OH number of 71;

Polyisocyanate compound B1: a polymeric MDI having a functionality of 2.1, a percentage of free isocyanate of 27.8% and a 2,4' isomer content of about 70 mol %;

Polyisocyanate compound B2: a polymeric MDI having a functionality of 2.7, a percentage of free isocyanate of 31.2% and a 2,4' isomer content of about 35 mol %;

Foaming agent: water;
Hydroxyl-grafted silicone surfactant NIAX from Witco having an OH number of 125;
Black pigment: 20 wt % carbon black dispersion in diisodecyl phthalate (DIDP); and
Gelling catalyst.

EXAMPLE 2 TO 5

These examples illustrate variants in which the NCO/OH ratio and the nature of the polyisocyanate component are varied.

EXAMPLE 6

This example illustrates the production of a harder foam by using an isocyanate of high functionality.

COMPARATIVE EXAMPLE 1

In this example, a flexible foam sold under the name SUPERSHEET H, based on a polyol derived from a fatty acid dimer and on toluene diisocyanate, was evaluated.

COMPARATIVE EXAMPLE 2

In this example, a flexible foam, also based on a polyol derived from a dimer acid, sold under the name SUPERSEAL, which is a foam obtained by the slabstock process, was evaluated.

COMPARATIVE EXAMPLE 3

In this example, a flexible foam obtained from non-hydrophobic polyols of the polyether polyol type having the following characteristics:
polyol A 2.1: functionality=3 OH number=42
polyol A 2.2: functionality=4 OH number=475
polyol A 2.3: functionality=3 OH number=29 was evaluated.
The formulation details and the properties of the products are given in the following table.

By comparing examples 1, 2 and 3 it may be seen that the choice of a low index very substantially improves the flexibility without jeopardizing the water impermeability.

In examples 4 and 5, the flexibility is improved by the lower functionality of the polyisocyanate component.

In example 6, the use of an isocyanate of high functionality gives a denser and harder foam.

Example 1 achieves a compromise between the water impermeability of the comparative product 1 and the flexibility of the comparative product 2.

The invention claimed is:

1. A water-impermeable flexible polyurethane foam obtained by:
reacting a polyol component with at least one polyisocyanate component in the presence of a foaming agent;
wherein:
the polyol component comprises at least one hydrophobic polyol;
the polyisocyanate component comprises at least 30 mol % of 2,4'-methylene-bis(phenylisocyanate) isomer (2,4'MDI);
the foam has a compression force of less than or equal to 12 kPa for 50% compression; and
a molar ratio of isocyanate functional groups to a total of alcohol functional groups and reactive functional groups (the index) is less than or equal to 0.85.

2. The polyurethane foam as claimed in claim 1, wherein the compression force is from around 8 to 12 kPA for 50% compression.

3. The polyurethane foam as claimed in claim 1, wherein the foam has a density not exceeding 150 kg/m$^3$.

4. The polyurethane foam of claim 1, wherein at least one of the polyol component and the polyisocyanate component has a functionality greater than 2.

5. The polyurethane foam of claim 1, wherein the polyol component is reacted with the polyisocyanate component in the presence of a monofunctional alcohol or amine component.

6. The polyurethane foam of claim 1, wherein the hydrophobic polyol comprises a fatty hydrocarbon chain.

TABLE 1

| | Formulation Example (parts by wt.) | | | | | | | | |
|---|---|---|---|---|---|---|---|---|---|
| | Ex. 1 | Ex. 2 | Ex. 3 | Ex. 4 | Ex. 5 | Ex. 6 | Comp. Ex. 1 | Comp. Ex. 2 | Comp. Ex. 3 |
| A1 | 100 | 100 | 100 | 100 | 100 | 100 | n.d. | n.d. | — |
| A 2.1 | — | — | — | — | — | — | n.d. | n.d. | 100 |
| A 2.2 | — | — | — | — | — | — | n.d. | n.d. | 12.8 |
| A 2.3 | — | — | — | — | — | — | n.d. | n.d. | 2.1 |
| Water | 2.6 | 2.6 | 2.6 | 2.6 | 2.6 | 1.6 | n.d. | n.d. | 3.7 |
| Catalyst | 1.5 | 1.5 | 1.5 | 1.5 | 1.5 | 0.5 | n.d. | n.d. | 0.3 |
| Surfactant | 0.5 | 0.5 | 0.5 | 0.5 | 0.5 | 0.5 | n.d. | n.d. | 1.5 |
| Black pigment | 4.8 | 3 | 4.8 | 4.8 | 3 | — | n.d. | n.d. | 4.78 |
| B1 | 41.4 | 44.0 | 46.4 | 48.7 | 51.7 | 0 | n.d. | n.d. | 51 |
| B2 | 7.3 | 7.8 | 8.2 | 0 | 0 | 31.8 | n.d. | n.d. | 17 |
| NCO/OH Index | 0.80 | 0.85 | 0.90 | 0.80 | 0.85 | 0.80 | | | 0.80 |
| Density (kg/m$^3$) | 52 | 48 | 46 | 52 | 48 | 100 | 55 | 55 | 54 |
| Skin | 2 | 2 | 2 | 2 | 2 | 2 | 2 | 0 | 2 |
| Compression force (kPa) | 8 | 10 | 12 | 7.1 | 8.9 | 20 | 15.9 | 12 | 12 |
| Impermeability test* | S | S | S | S | S | S | S | US | US |

*S = Satisfactory; US = Unsatisfactory

7. The polyurethane foam as claimed in claim 6, wherein the hydrophobic polyol is derived from a fatty acid dimer.

8. The polyurethane foam of claim 1, wherein the polyisocyanate component comprises 4,4'-methylene-bis(phenylisocyanate) (4,4'MDI).

9. The polyurethane foam of claim 1, wherein the foaming agent comprises water.

10. The polyurethane foam of claim 1, wherein the foam is obtained in the presence of at least one additive having at least one reactive functional group that reacts with the polyisocyanate component or with the polyol component.

11. A process for manufacturing the polyurethane foam as claimed in claim 1, comprising:
    preparing a reaction mixture comprising the polyol component, the polyisocyanate component and the foaming agent;
    casting the reaction mixture on a conveyor belt; and
    running the conveyor belt and the cast mixture through a crosslinking oven.

12. The process as claimed in claim 11, further comprising:
    depositing an upper protective film on the cast mixture;
    wherein running the conveyor belt and the cast mixture comprises running the conveyor belt and the cast mixture coated with the upper protective film through the crosslinking oven.

13. The process of claim 12, further comprising casting a lower protective film on the conveyor belt before casting the reaction mixture on the conveyor belt.

14. The process of claim 13, wherein at least one of the lower protective film and the upper protective film comprises an adhesive provided on a surface that contacts the reaction mixture.

15. The process of claim 13, further comprising:
    removing the lower protective film and/or the upper protective film; and
    attaching a further film comprising an adhesive to a free surface of the foam strip.

16. A process for manufacturing the polyurethane foam as claimed in claim 1, comprising:
    preparing a reaction mixture comprising the polyol component, the polyisocyanate component and the foaming agent;
    injection or casting the reaction mixture in a closed or open mold; and
    crosslinking the mixture in the mold.

17. The polyurethane foam as claimed in claim 2, wherein the polyurethane foam has a density not exceeding 150 kg/m$^3$.

18. The polyurethane foam as claimed in claim 1, wherein the polyurethane foam has a density not exceeding 60 kg/m$^3$.

19. A water-impermeable flexible polyurethane foam obtained by:
    reacting a polyol component with at least one polyisocyanate component in the presence of a foaming agent;
    wherein:
    the polyol component comprises at least one hydrophobic polyol;
    the polyisocyanate component comprises at least 30 mol % of 2,4'-methylene-bis(phenylisocyanate) isomer (2,4'MDI);
    the polyisocyanate component comprises 4,4'-methylene-bis(phenylisocyanate) isomer (4,4'MDI);
    the foam has a compression force of less than or equal to 12 kPa for 50% compression; and
    a molar ratio of isocyanate functional groups to a total of alcohol functional groups and reactive functional groups (the index) is less than or equal to 0.85.

20. A water-impermeable flexible polyurethane foam obtained by:
    reacting a polyol component with at least one polyisocyanate component in the presence of a foaming agent;
    wherein:
    the polyol component comprises at least one hydrophobic polyol;
    the polyol component has a functionality of from 2.1 to 2.3;
    the polyisocyanate component comprises at least 30 mol % of 2,4'-methylene-bis(phenylisocyanate) isomer (2,4'MDI);
    the polyisocyanate component comprises 4,4'-methylene-bis(phenylisocyanate) isomer (4,4'MDI);
    the polyisocyanate component has a functionality of from 2.1 to 2.3;
    the foam has a compression force of less than or equal to 12 kPa for 50% compression; and
    a molar ratio of isocyanate functional groups to a total of alcohol functional groups and reactive functional groups (the index) is less than or equal to 0.85.

* * * * *